(12) United States Patent
Chtcherbatchenko et al.

(10) Patent No.: US 7,447,706 B2
(45) Date of Patent: Nov. 4, 2008

(54) METHOD AND SYSTEM FOR GENERATING AN AUTO-COMPLETION LIST FOR A CASCADING STYLE SHEET SELECTOR

(75) Inventors: Andrei V. Chtcherbatchenko, Redmond, WA (US); Hessan Tchaitchian, Seattle, WA (US); Daniel P. Chartier, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 11/097,629

(22) Filed: Apr. 1, 2005

(65) Prior Publication Data
US 2006/0224553 A1    Oct. 5, 2006

(51) Int. Cl.
*G06F 7/00* (2006.01)
*G06F 17/00* (2006.01)
(52) U.S. Cl. ............ 707/104.1; 707/101; 707/102
(58) Field of Classification Search .......... None
See application file for complete search history.

(56) References Cited

U.S. PATENT DOCUMENTS 6,377,965 B1 *  4/2002  Hachamovitch et al. ..... 715/534

* cited by examiner

*Primary Examiner*—Christian P. Chace
*Assistant Examiner*—Michael J Hicks
(74) *Attorney, Agent, or Firm*—Merchant & Gould; Ryan T. Grace

(57) ABSTRACT

An auto-completion list for a cascading style sheet (CSS) selector is generated based on user input and contextual information associated with a target document. The user input that triggers the generation of the auto-completion list is entered while creating a CSS selector. A CSS block in the target document is parsed to determine the contextual information associated with the target document corresponding to the user input. The contextual information and the user input are analyzed to determine appropriate elements to add to the CSS selector to complete CSS selector syntax. The appropriate elements are provided in the auto-completion list. The auto-completion list is displayed proximate the location where the user entered the input that triggered generation of the auto-completion list. The user may then select one of the elements displayed in the auto-completion list to add the selected element to the CSS selector syntax.

16 Claims, 7 Drawing Sheets

METHOD AND SYSTEM FOR GENERATING AN AUTO-COMPLETION LIST FOR A CASCADING STYLE SHEET SELECTOR

BACKGROUND

Cascading style sheets (CSS) provide web site developers with control over the visual appearance, style (e.g., size, color, font, margins, etc.), and positioning of text in web pages without compromising the structure of the page. Developers may use CSSs to create templates for attaching style rules to structured documents (e.g., hypertext markup language (HTML) documents and extensible markup language (XML) applications). CSSs separate the presentation style of documents from the content of the documents thereby simplifying web authoring and site maintenance. CSSs may include instructions in the code of a web site that describe how a browser should render any instance of a particular element on a page. For example, style sheets can provide instructions for how all of the hypertext, headers, links, or text should appear.

SUMMARY

The present disclosure is directed to a method and system for generating an auto-completion list for a cascading style sheet (CSS) selector. A CSS block that includes the CSS selector corresponds to a target document (e.g., an HTML or XML document). As a user types or selects characters to generate CSS selector syntax, certain user input triggers generation of the auto-completion list. Examples of user input that trigger the generation of an auto-completion list include a hash (#) that may be associated with an ID value element, a space that may be associated with a tag element, a period (.) that may be associated with a class element or a pseudo-class element, an open curly bracket ({) that may be associated with a property element, and a colon (:) that may be associated with a property value element.

The triggering user input causes a portion of the target document corresponding to the CSS block to be parsed. Contextual information associated with the CSS selector is collected from the parsed target document. The contextual information may be obtained from the portion of the CSS selector preceding the location of the user input, the statements surrounding the user input in the target document, or the CSS selector syntax. The contextual information and the user input that triggered the generation of the auto-completion list are analyzed to determine appropriate elements to add to the CSS selector for completion of the CSS selector syntax. The appropriate elements are provided in the auto-completion list. The auto-completion list is displayed proximate the location where the user entered the input that triggered creation of the auto-completion list. The user may then select one of the elements displayed in the auto-completion list to add the element to the CSS selector syntax.

In accordance with one aspect of the invention, user input that triggers generation of the auto-completion list is received. A target document that is associated with a CSS selector is parsed. Contextual information associated with the CSS selector is collected from the parsed target document. The contextual information and the user input are analyzed to determine elements that may be used to add to the CSS selector. The auto-completion list is created with the elements. The auto-completion list is displayed. A selection of one of the elements is received to add the element to the CSS selector.

Other aspects of the invention include system and computer-readable media for performing these methods. The above summary of the present disclosure is not intended to describe every implementation of the present disclosure. The figures and the detailed description that follow more particularly exemplify these implementations. dr

DETAILED DESCRIPTION OF THE PREFERRED EMBODIMENT

The present disclosure is directed to a method and system for generating an auto-completion list for a cascading style sheet (CSS) selector. A CSS block that includes the CSS selector corresponds to a target document (e.g., an HTML or XML document). As a user types or selects characters to generate CSS selector syntax, certain user input triggers generation of the auto-completion list. The triggering user input causes a portion of the target document corresponding to the CSS block to be parsed. Contextual information associated with the CSS selector is collected from the parsed target document. The contextual information may be obtained from the portion of the CSS selector preceding the location of the user input, the statements surrounding the user input in the target document, or the CSS selector syntax. The contextual information and the user input that triggered the generation of the auto-completion list are analyzed to determine appropriate elements to add to the CSS selector for completion of the CSS selector syntax. The appropriate elements are provided in the auto-completion list. The auto-completion list is displayed proximate the location where the user entered the input that triggered creation of the auto-completion list. The user may then select one of the elements displayed in the auto-completion list to add the element to the CSS selector syntax.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
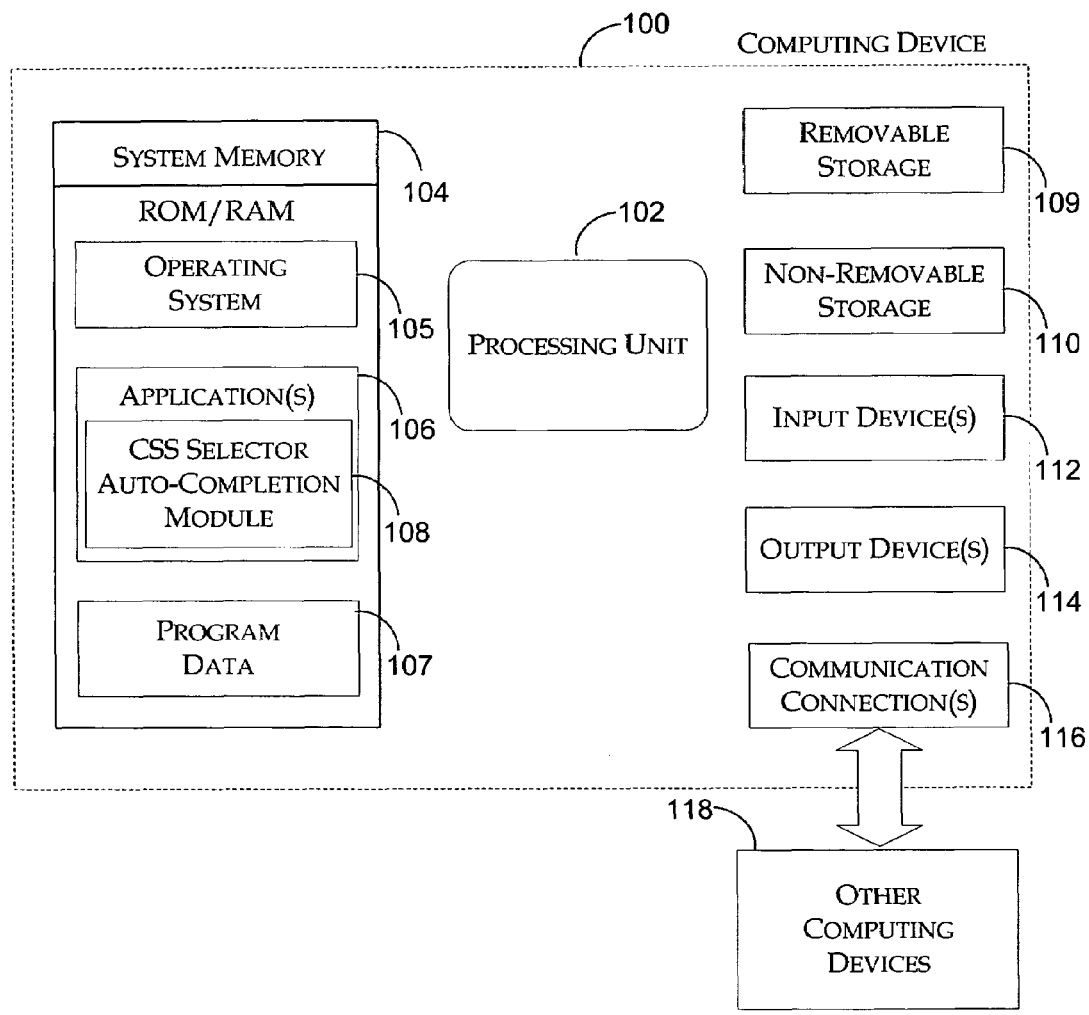
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A CSS selector auto-completion module 108, which is described in detail below with reference to FIGS. 2-7, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Generating an Auto-Completion List for a Cascading Style Sheet Selector

The present disclosure is described in the general context of computer-executable instructions or components, such as software modules, being executed on a computing device. Generally, software modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

A cascading style sheet (CSS) includes style rules that inform a browser how to render a document on a web page. A style element that contains the style rules for the page may be placed in the document head. Each rule includes a CSS selector and the style to be applied to the CSS selector. CSS selectors are expressions that may be used to match HTML or XML document elements. Style rules may be formed using the following expression: selector{property:value}. Multiple style declarations for a single selector may be separated by a semicolon. For example, selector{property1:value1;property2:value2}.

The following CSS code segment defines the color and font-size properties for elements H1 and H2:

```
<HEAD>
    <TITLE>CSS Example</TITLE>
    <STYLE TYPE="text/css">
        H1 {font-size: x-large; color: red}
        H2 {font-size: large; color: blue}
    </STYLE>
</HEAD>
```

The above CSS selector informs the browser to display level-one headings in an extra-large, red font, and to display level-two headings in a large, blue font.

A simple CSS selector matching a single element may be written in the form: {tag} {.class} {#id}. For example, "td.Earnings" matches the element <td class="Earnings">. CSS selectors can be appended together to match a nested structure. For example, the following expression "table#Profits td.Earnings" only matches <td class="Earnings"> elements that are children of a <table id="Profits"> element.

The following expression is an example of a CSS block that includes a CSS selector and a style rule:

div#contenttd.headtd#first{color:red}

The space between "div#content" and "td.headtd#first" indicates that "td.headtd#first" occurs in the context of "div#content" (i.e., the td tag is nested within the div tag).

The CSS selector includes elements that correspond to certain attributes. For example, the expression following the hash (#) (e.g., first) refers to the identifier (ID) which corresponds to a tag attribute. The expression following the period (".") is the class ("headtd"). The CSS block corresponds to the following HTML code:

```
<div id=content>
    <td class = headtd
        id=first>
    </td
</div>
```

When an HTML or XML document and the corresponding schema (i.e., a formal description of the XML/HTML document element hierarchy) is known, contextual information may be analyzed to provide an auto-completion list of potential elements for user selection as the user generates CSS selector syntax. Thus, the user need not remember the structure of the document during creation of the CSS selector syntax (e.g., was the class "profit" or "profits"?). The number of keystrokes required to create the CSS selector syntax may also be reduced.

Generation of the auto-completion list utilizes smart completion code, such as IntelliSense® technology developed by the Microsoft Corporation of Redmond, Wash. Smart completion code anticipates user action and reduces the number of steps a user need take to complete the action. For example, smart completion code may represent a set of behaviors that aids a web developer by providing reminders of appropriate elements and attributes. The reminders may be presented as a pop-up interactive window list.

Smart completion code for a CSS selector utilizes a tree data structure of the target document (e.g., an HTML or XML document), a tree data structure of the schema associated with the document, and a parser. Smart completion code displays or applies auto-completion text in response to user input. For CSS selector auto-completion in a code editor implementation, the user input may enter specific characters (e.g., space, period, colon, tab or hash (#)) that trigger generation of the auto-completion list. Different user inputs result in the creation of different auto-completion lists. Auto-completion lists for CSS selectors may include any CSS selector element (e.g., HTML/XML tags, descendent tags, classes, pseudo-classes, identifiers, attributes, properties, and values).

Contextual information may be collected by saving a list of elements from the target document tree data structure that match any preceding CSS selector elements. The contextual information may be collected using CSS selector implementation. For example, if the current CSS selector is "table.foo td.", the contextual information is "table.foo td" and would contain all <td>elements that are descendents of a <table class="foo">element. A null context results when no preceding CSS selector elements exist. A null context causes all known tags in the target document schema to be shown in the auto-completion list. A null context is different than an empty context. An empty context implies that no element matches have been found.

A descendent element list is generated by locating all element tags that exist as descendents of the contextual information in the target document. Class or ID auto-completion lists are determined by listing all class or ID attribute values in the contextual information. In one embodiment, a code view implementation invokes the class auto-completion list when the period keystroke is hit. In another embodiment, the ID auto-completion list is invoked when the hash keystroke is hit. In yet another embodiment, a pseudo-class auto-completion list is generated by analyzing a tag preceding the location of the user input in the CSS selector syntax and mapping the tag to available pseudo-classes. The contextual information may be stored in the document schema, a separate CSS schema or in some other form.

Figure 2:
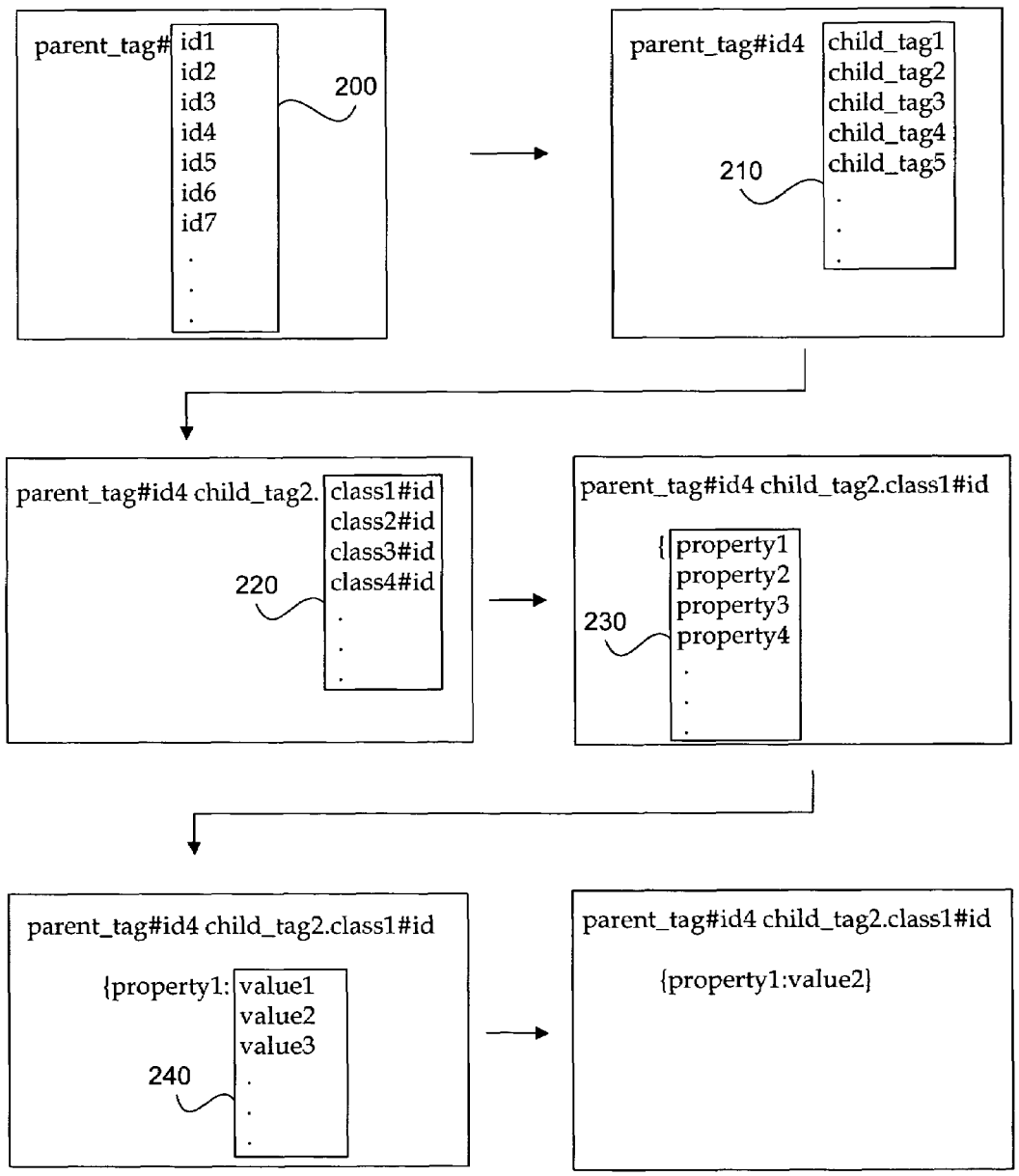
FIG. 2 illustrates several user interface displays illustrating pop-up interactive windows that each include an auto-completion list for a cascading style sheet (CSS) selector, in accordance with at least one feature of the present invention.

FIG. 2 illustrates several user interface displays illustrating pop-up interactive windows that each include an auto-completion list for a cascading style sheet (CSS) selector as implemented on computing device 100 shown in FIG. 1. The auto-completion lists are generated from contextual information collected from parsed target documents associated with a CSS selector. As a user types CSS selector syntax, there are many positions where the auto-completion list may be generated and displayed. For example, auto-completion list 200 is displayed after the user types a hash (#), auto-completion list 210 is displayed after the user types a space, auto-completion list 220 is displayed after the user types a period (.), auto-completion list 230 is displayed after the user types an open curly brace ({), and auto-completion list 240 is displayed after the user types a colon (:).

In one embodiment, an auto-completion list may be displayed with a complete list of tags that may be used in the CSS selector syntax before the user begins to enter any syntax. The tags are located in the target document schema. The target document schema defines the core syntax of the target document (i.e., the text that can/cannot be used in the document).

Referring to the upper left user display, the user may enter a tag by typing "parent_tag#" or selecting a tag from an auto-completion list. For example, the tag may be "div". The hash (#) triggers the generation of an ID value auto-completion list. The target document associated with the CSS selector is parsed to determine contextual information and locate acceptable ID values that may be associated with "parent_tag". The contextual information may be obtained from the portion of the CSS selector preceding the user input location, the statements surrounding the hash in the target document, or the CSS selector syntax. All acceptable ID values (e.g., id1-id7) are determined from the contextual information and the user input that triggered the generation of the auto-completion list (e.g., the hash). Acceptable ID values are displayed in auto-completion list 200 proximate the hash. The user may then select one of the ID values displayed in auto-completion list 200. In the example shown, the user selects "id4". For example, "id4" may correspond to "content" which is an acceptable ID value to associate with the "div" tag.

After selecting "id4" the user may enter <space>which triggers the generation of auto-completion list 210. The parsed target document text in "parent_tag" with ID="id4" is analyzed to determine acceptable tags that may be added to the CSS selector syntax. Auto-completion list 210 is displayed with the tags that may be used with "parent_tag#id4". Appropriate tags may include "child_tag1"-"child_tag5". For example, "child_tag2" may correspond to a "td" tag. The user may then select "child tag2" and then type a period (.).

Auto-completion list 220 is generated after the user types the period. All of the "child_tag2" tags in the parsed target document that include classes are analyzed to determine which classes that may be used in the CSS selector syntax. The appropriate classes are presented in auto-completion list 220. For example, all acceptable classes that correspond to the "child_tag2" nested in "parent_tag" with ID="id4" are displayed in auto-completion list 220. Acceptable classes may include "class1#id"-"class4#id". The user can select "class1#id" which may correspond to "headtd#first".

The user may then enter an open curly brace ({) to enter a property associated with a rule. All acceptable properties that may be associated with the target document and the CSS selector may be displayed in auto-completion list 230. For example, "property1"-"property4" correspond to acceptable properties. The user may select "property1" (e.g., color). The user may then type a colon (:).

Auto-completion list 240 is then generated with acceptable values to associate with "property1". Examples of acceptable values include "value1"-"value3". The user can select "value2" which may correspond to "red" which is an acceptable value to associate with a color property in the CSS selector and rule statement. The user may then type a selector termination character such as a closed curly brace (}) to complete the CSS selector and rule statement.

Some properties in CSS selector syntax consist of serial values. In the following example, border:width,style,color "border" is the property and the value consists of three parts (width, style and color). For example, "1px" is an acceptable value for border width, "solid" is an acceptable value for the style of the line used for the border, and "red" is an acceptable value for the color of the border. The three values may be listed in any order.

After the user types the colon, a tool tip may be displayed as: "width style color" which indicates that a user input for width is expected first. A user may type "1px" and then a space. An auto-completion list may be displayed which lists possible style values. However, the user may type "red". When the target document is parsed, "red" is determined to be an invalid definition for style but a valid definition for color. A determination is made that the user entered the values in a different order than the order prompted by the tool tip. Thus, a different tool tip is displayed as: "width color style".

Figure 3:
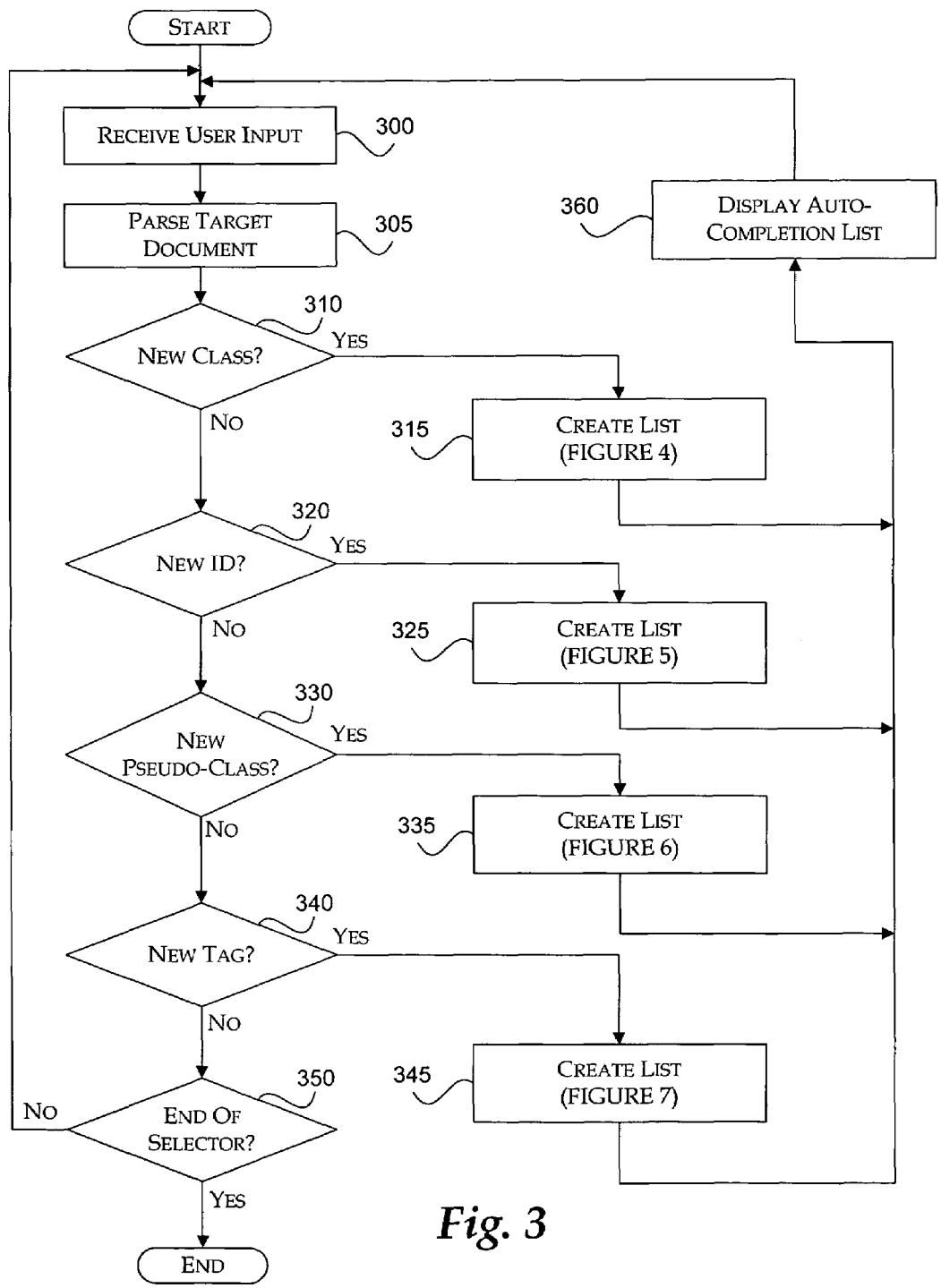
FIG. 3 illustrates an operational flow diagram illustrating a process for generating an auto-completion list for a CSS selector, in accordance with at least one feature of the present invention.

FIG. 3 illustrates an operational flow diagram illustrating a process for generating an auto-completion list for a CSS selector. The process begins at a start block where a user generates CSS selector syntax by typing or selecting characters. The CSS selector is part of a CSS block that is associated with a target document. The target document may be an HTML or XML document.

User input that triggers the generation of an auto-completion list is received at block 300. The user input may be associated with an element of the CSS selector. Examples of user input include a hash (#) that may be associated with an ID value element, a space that may be associated with a tag element, a period (.) that may be associated with a class element or a pseudo-class element, an open curly bracket ({) that may be associated with a property element, and a colon (:) that may be associated with a property value element. The CSS selector is analyzed to determine whether the triggering user input is a part of the CSS selector.

Moving to block 305, the portion of the target document corresponding to the CSS block is parsed to determine contextual information associated with the target document. The contextual information may include portion of the CSS selector preceding the location of the user input, the statements surrounding the user input in the target document, and the CSS selector syntax. The contextual information from the parsed document and the user input are analyzed to generate the auto-completion list.

In one example, a style tag associated with the CSS block is located in the target document. The current user input position is then located in the target document. The target document is parsed up to the current user input position, and the contextual information is collected. The contextual information may provide further information associated with the user input that invoked the generation of the auto-completion list and elements of the CSS selector (e.g., tags, ID values, class attribute values, pseudo-classes, etc.)

In another example, the CSS block may include a first element followed by a space and a second element. Thus, the second element occurs in the context of the first element (i.e., a second tag is nested within a first tag). When the target document is analyzed for the auto-completion list that corresponds to the second element, only the elements that occur within the first element are displayed in the auto-completion list.

Proceeding to decision block 310, a determination is made whether the next portion of the CSS selector to be input by the user is a new class. If the next portion of the CSS selector is not a new class, processing proceeds to decision block 320. If the next portion of the CSS selector is a new class, processing continues at block 315 where the auto-completion list is created as described in reference to FIG. 4. Processing then proceeds to block 360 where the auto-completion list is displayed proximate the location where the user input was received. Processing then continues at block 300.

Advancing to decision block 320, a determination is made whether the next portion of the CSS selector to be input by the user is a new ID. If the next portion of the CSS selector is not a new ID, processing proceeds to decision block 330. If the next portion of the CSS selector is a new ID, processing continues at block 325 where the auto-completion list is created as described in reference to FIG. 5. Processing then proceeds to block 360 where the auto-completion list is displayed proximate the location where the user input was received. Processing then continues at block 300.

Transitioning to decision block 330, a determination is made whether the next portion of the CSS selector to be input by the user is a new pseudo-class. If the next portion of the CSS selector is not a new pseudo-class, processing proceeds to decision block 340. If the next portion of the CSS selector is a new pseudo-class, processing continues at block 335 where the auto-completion list is created as described in reference to FIG. 6. Processing then proceeds to block 360 where the auto-completion completion list is displayed proximate the location where the user input was received. Processing then continues at block 300.

Continuing to decision block 340, a determination is made whether the next portion of the CSS selector to be input by the user is a new tag. If the next portion of the CSS selector is not a new tag, processing proceeds to decision block 350. If the next portion of the CSS selector is a new tag, processing continues at block 345 where the auto-completion list is created as described in reference to FIG. 7. Processing then proceeds to block 360 where the auto-completion list is displayed proximate the location where the user input was received. Processing then continues at block 300.

Moving to decision block 350, a determination is made whether the end of the CSS selector has been reached. If the end of the CSS selector has not been reached processing returns to block 300. If the end of the CSS selector has been reached processing terminates at an end block.

Figure 4:
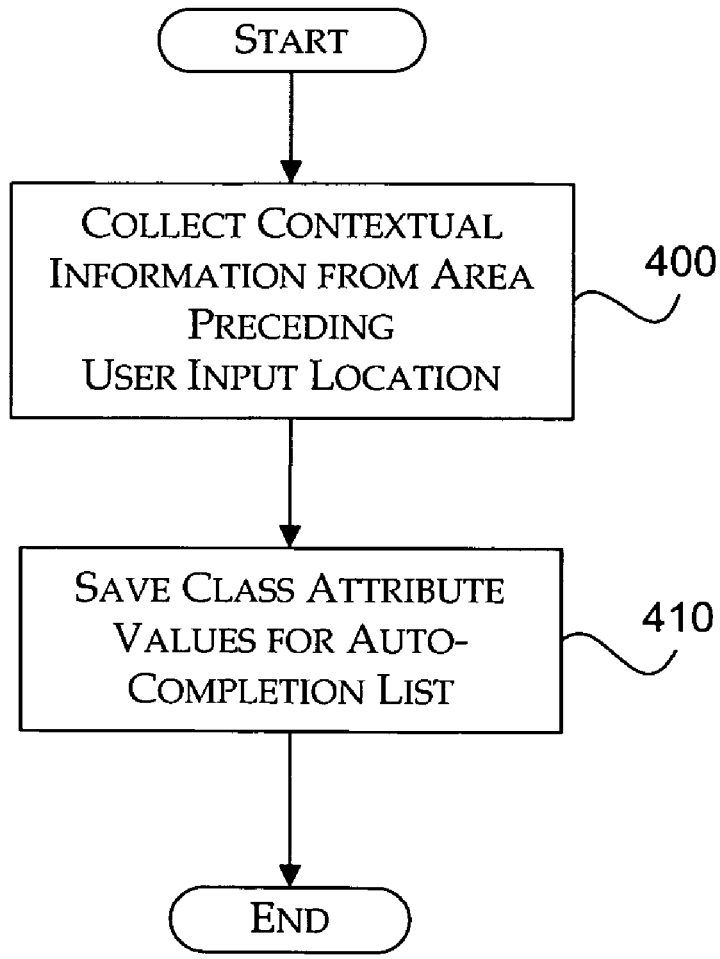
FIGS. 4-7 illustrate operational flow diagrams of different processes for creating an auto-completion list, in accordance with at least one feature of the present invention.

FIG. 4 illustrates an operational flow diagram illustrating a process for creating an auto-completion list for a new class. The process begins at a start block where the user input and the portion of the target document corresponding to the CSS block have been analyzed. The contextual information for the new class is collected from the portion of the parsed target document preceding the location of the user input at block 400. Advancing to block 410, class attribute values preceding the location of the user input are saved for inclusion in the auto-completion list. Processing then terminates at an end block.

Figure 5:
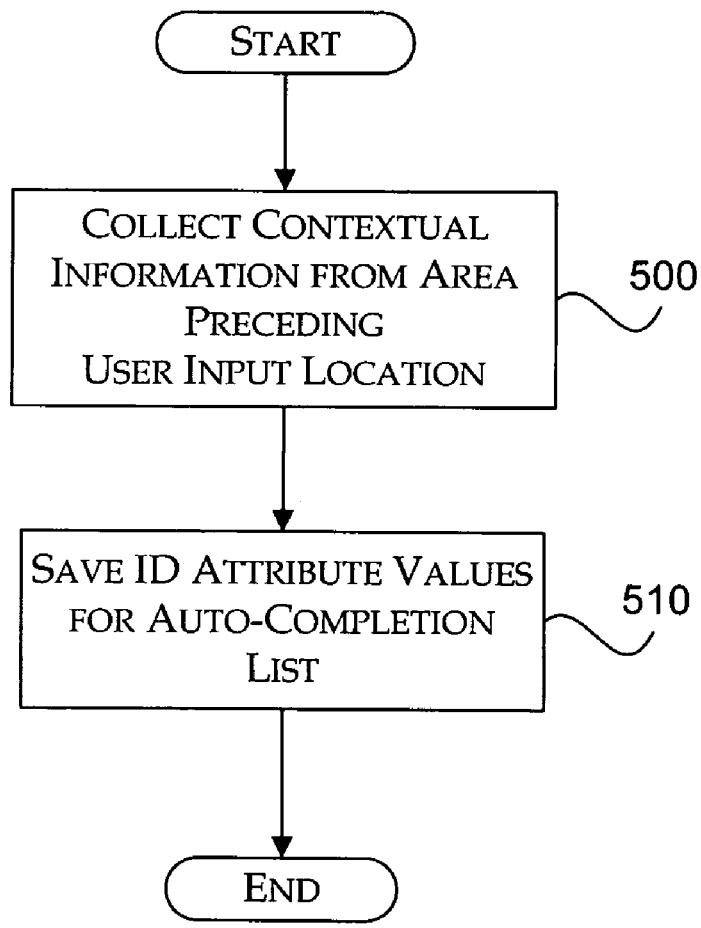

FIG. 5 illustrates an operational flow diagram illustrating a process for creating an auto-completion list for a new ID. The process begins at a start block where the user input and the portion of the target document corresponding to the CSS block have been analyzed. The contextual information for the new class is created from the portion of the parsed target document preceding the location of the user input at block 500. Continuing to block 510, ID attribute values preceding the location of the user input are saved for inclusion in the auto-completion list. Processing then terminates at an end block.

Figure 6:
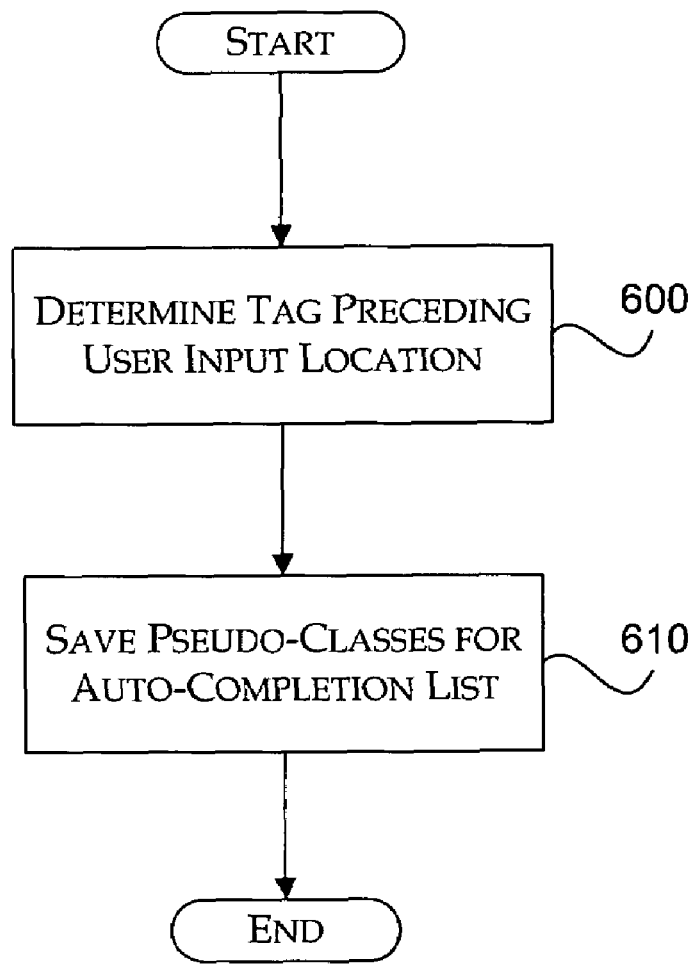

FIG. 6 illustrates an operational flow diagram illustrating a process for creating an auto-completion list for a new pseudo-class. The process begins at a start block where the user input and the portion of the target document corresponding to the CSS block have been analyzed. The tag in the portion of the target document preceding the location of the user input is determined at block 600. Moving to block 610, pseudo-classes in the portion of the target document preceding the location of the user input are saved for inclusion in the auto-completion list. Processing then terminates at an end block.

Figure 7:
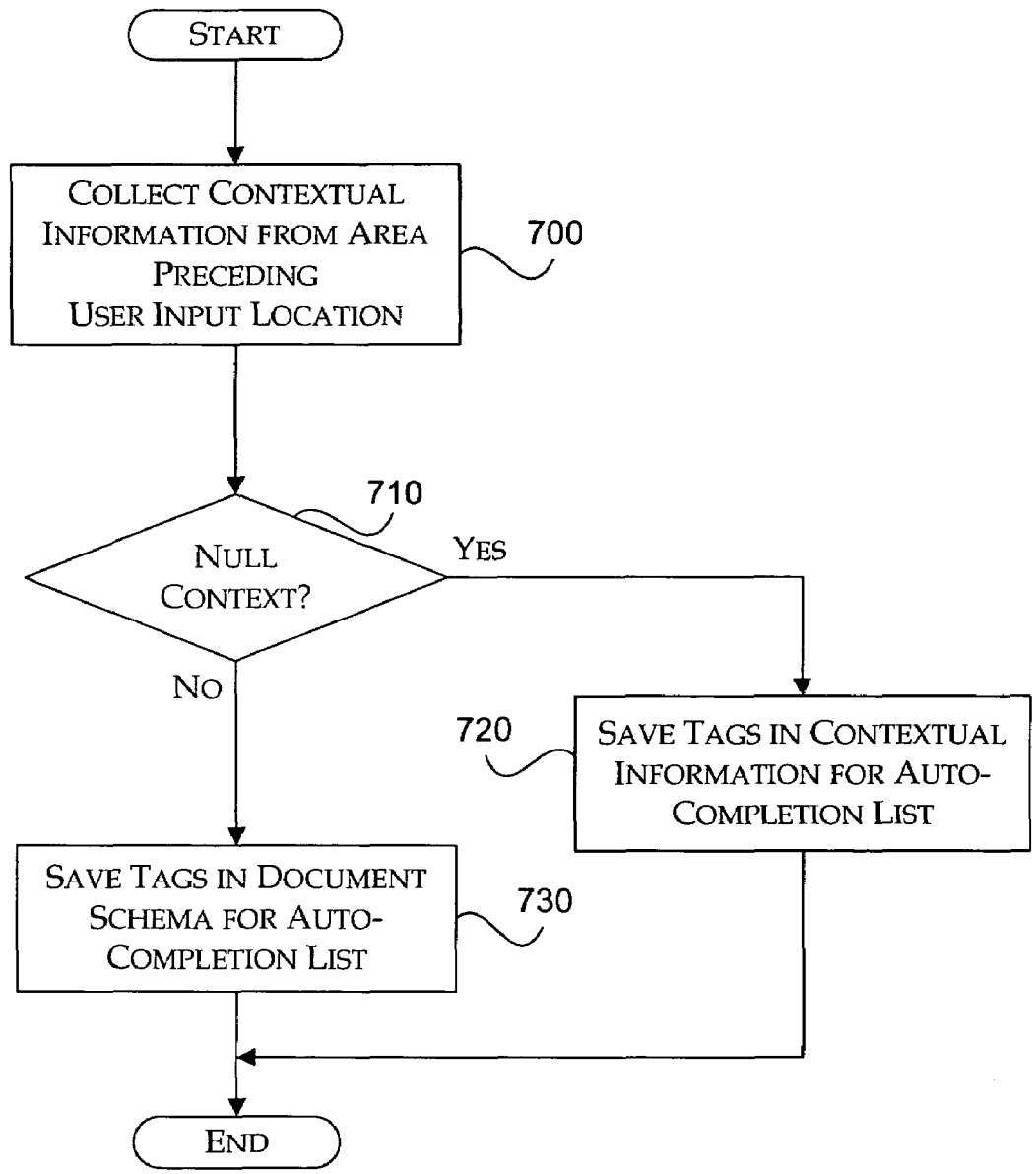

FIG. 7 illustrates an operational flow diagram illustrating a process for creating an auto-completion list for a new tag. The process begins at a start block where the user input and the portion of the target document corresponding to the CSS block have been analyzed. Contextual information for the new tag is created from the portion of the parsed target document preceding the location of the user input at block 700. Moving to decision block 710, a determination is made whether the contextual information is null. The contextual information is determined to be null when no CSS selector elements preceding the location of the user input exist. If the contextual information is null, processing proceeds to block 720 where tags in the portion of the parsed target document preceding the location of the user input are saved for inclusion in the auto-completion list. Processing then terminates at an end block. If the contextual information is not null, processing proceeds to block 730 where tags in the document schema are saved for inclusion in the auto-completion list. Processing then terminates at the end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for populating an auto-complete list for a cascading style (CSS) selector, the method comprising:
   receiving a user input that triggers generation of the auto-completion list for the CSS selector, wherein the user input is in a CSS selector of a target mark-up language document;
   parsing the portion of the target mark-up language document that precedes the user input that triggered the generation of the auto-completion list for the CSS selector to determine contextual information associated with the CSS selector;
   when the determined contextual information indicates a new class, populating the auto-completion list with class attribute values indicated in the parsed portion of the target mark-up language document that precedes the user input that triggered the generation of the auto-completion list for the CSS selector;
   when the determined contextual information indicates a new ID, populating the auto-completion list with ID attribute values indicated in the parsed portion of the target mark-up language document that precedes the user input that triggered the generation of the auto-completion list for the CSS selector;
   when the determined contextual information indicates a pseudo-class, populating the auto-completion list with pseudo-classes indicated in the parsed portion of the target mark-up language document that precedes the user input that triggered the generation of the auto-completion list for the CSS selector; when the determined contextual information indicates a property associated with a rule, populating the auto-completion list with properties associated with the target mark-up language document and the CSS selector, wherein selection of a property in the auto-completion list causes the auto-completion list to populate with acceptable values of the selected property derived from the parsed target mark-up language document; and
   when the determined contextual information indicates a new tag,
      determining whether selector elements precede the user input,
      when selector elements do not precede the user input, populating the auto-completion list with tags indicated in the parsed portion of the target mark-up language document that precedes the user input that triggered the generation of the auto-completion list for the CSS selector, and
      when selector elements precede the user input, populating the auto-completion list with tags located in a schema of the target mark-up language document.

2. The computer-implemented method of claim 1, wherein the user input includes at least one member of a group comprising: a hash, a tab, a space, a period, a curly bracket, and a colon.

3. The computer-implemented method of claim 1, wherein parsing the portion of the target mark-up language document that precedes the user input that triggered the generation of the auto-completion list for the CSS selector to determine contextual information associated with the CSS selector includes at least one member of a group comprising: parsing the portion of the target mark-up document proximate the location of the user input, parsing the CSS selector, and parsing an element preceding the user input.

4. The computer-implemented method of claim 1, wherein selection of a property in the auto-completion list causes the auto-completion list to populate with acceptable serial values of the selected property.

5. The computer-implemented method of claim 4, where a tool tip is displayed that includes guidance for selecting the serial values of the selected property.

6. A computer-readable storage medium having computer executable instructions for populating an auto-complete list for a cascading style (CSS) selector, the instructions comprising:
   receiving a user input that triggers generation of the auto-completion list for the CSS selector, wherein the user input is in a CSS selector of a target mark-up language document;
   parsing the portion of the target mark-up language document that precedes the user input that triggered the generation of the auto-completion list for the CSS selector to determine contextual information associated with the CSS selector;
   obtaining, from the parsed portion of the target mark-up language document that precedes the user input that triggered the generation of the auto-completion list for the CSS selector, at least one member of a group comprising: a class attribute value, ID attribute values, pseudo-classes, a property and tags; and
   based on the determined contextual information, populating the auto-completion list with the at least one member of the group comprising: the class attribute value, the ID attribute values, the pseudo-classes, a property and the tags wherein selection of a property in the auto-completion list causes the auto-completion list to populate with acceptable values of the selected property derived from the parsed target mark-up language document.

7. The computer-readable storage medium of claim 6, wherein the user input includes at least one member of a group comprising: a hash, a tab, a space, a period, a curly bracket, and a colon.

8. The computer-readable storage medium of claim 7, wherein parsing the portion of the target mark-up language document that precedes the user input that triggered the generation of the auto-completion list for the CSS selector to determine contextual information associated with the CSS selector includes at least one member of a group comprising: parsing the portion of the target mark-up document proximate the location of the user input, parsing the CSS selector, and parsing an element preceding the user input.

9. The computer-readable storage medium of claim 6, wherein when the determined contextual information indicates a property associated with a rule, populating the auto-completion list with properties associated with the target mark-up language document and the CSS selector.

10. The computer-readable storage medium of claim 6, wherein selection of a property in the auto-completion list causes the auto-completion list to populate with acceptable serial values of the selected property.

11. The computer-readable storage medium of claim 10, where a tool tip is displayed that includes guidance for selecting the serial values of the selected property.

12. A system for populating an auto-complete list for a cascading style (CSS) selector, the system comprising:
   a processor; and
   a memory having computer-executable instructions, the instructions being configured for:
      receiving a user input that triggers generation of the auto-completion list for the CSS selector, wherein the user input is in a CSS selector of a target mark-up language document;
      parsing the portion of the target mark-up language document that precedes the user input that triggered the generation of the auto-completion list for the CSS selector to determine contextual information associated with the CSS selector;
      obtaining, from the parsed portion of the target mark-up language document that precedes the user input that triggered the generation of the auto-completion list for the CSS selector, at least one member of a group comprising: a class attribute value, ID attribute values, pseudo-classes, a property and tags; and
      based on the determined contextual information, populating the auto-completion list with the at least one member of the group comprising: the class attribute value, the ID attribute values, the pseudo-classes, a property and the tags, wherein selection of a property in the auto-completion list causes the auto-completion list to populate with acceptable values of the selected property derived from the parsed target mark-up language document.

13. The computer-readable storage medium of claim 12, wherein parsing the portion of the target mark-up language document that precedes the user input that triggered the generation of the auto-completion list for the CSS selector to determine contextual information associated with the CSS selector includes at least one member of a group comprising: parsing the portion of the target mark-up document proximate the location of the user input, parsing the CSS selector, and parsing an element preceding the user input.

14. The system of claim 12, wherein when the determined contextual information indicates a property associated with a rule, populating the auto-completion list with properties associated with the target mark-up language document and the CSS selector.

15. The system of claim 12, wherein selection of a property in the auto-completion list causes the auto-completion list to populate with acceptable serial values of the selected property.

16. The system of claim 15, where a tool tip is displayed that includes guidance for selecting the serial values of the selected property.

* * * * *